(12) United States Patent
Choi et al.

(10) Patent No.: US 12,118,678 B2
(45) Date of Patent: Oct. 15, 2024

(54) METHOD AND APPARATUS FOR DISPLAYING AUGMENTED REALITY OBJECT

(71) Applicant: Samsung Electronics Co., Ltd., Suwon-si (KR)

(72) Inventors: Daiwoong Choi, Suwon-si (KR); Soowan Kim, Suwon-si (KR); Sanghun Lee, Suwon-si (KR); Yongjin Cho, Suwon-si (KR); Hyunsoo Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 86 days.

(21) Appl. No.: 17/883,077

(22) Filed: Aug. 8, 2022

(65) Prior Publication Data
US 2022/0383598 A1    Dec. 1, 2022

Related U.S. Application Data

(63) Continuation of application No. PCT/KR2022/001700, filed on Feb. 3, 2022.

(30) Foreign Application Priority Data

Feb. 10, 2021    (KR) .................. 10-2021-0019448

(51) Int. Cl.
*G06T 19/00*    (2011.01)
*G06F 3/0346*    (2013.01)
*G06V 20/20*    (2022.01)

(52) U.S. Cl.
CPC .......... *G06T 19/006* (2013.01); *G06F 3/0346* (2013.01); *G06V 20/20* (2022.01)

(58) Field of Classification Search
CPC ...... G06F 3/0346; G06V 20/20; G06T 19/006
See application file for complete search history.

(56) References Cited

U.S. PATENT DOCUMENTS

| 2011/0242134 | A1 | 10/2011 | Miller et al. |
| 2012/0249591 | A1 | 10/2012 | Maiocci et al. |
| 2012/0249741 | A1 | 10/2012 | Maiocci et al. |
| 2015/0235426 | A1* | 8/2015 | Lyons ............... A63F 13/26 345/8 |

(Continued)

FOREIGN PATENT DOCUMENTS

| CN | 103460256 A | 12/2013 |
| CN | 105031919 A | 11/2015 |

(Continued)

*Primary Examiner* — Charles Tseng
(74) *Attorney, Agent, or Firm* — Jefferson IP Law, LLP

(57) ABSTRACT

An electronic device is provided. The electronic device is configured to execute an augmented reality (AR) application, to obtain an image, to obtain sensing information including at least one of posture information or position information of the electronic device that correspond to the image, to produce a virtual object that is superimposed on the image according to a user input, to obtain, based on the image and the sensing information, identification information corresponding to the virtual object, and to output the virtual object to a display, in response to a case in which information, obtained via at least one sensor in the state in which the AR application is executed, corresponds to the sensing information.

20 Claims, 8 Drawing Sheets

(56) References Cited

U.S. PATENT DOCUMENTS

| | | | |
|---|---|---|---|
| 2016/0049011 A1 | 2/2016 | Kasahara et al. | |
| 2016/0225164 A1* | 8/2016 | Tomlin | G02B 27/0172 |
| 2019/0311544 A1 | 10/2019 | Kayo et al. | |
| 2020/0349350 A1 | 11/2020 | Toh et al. | |
| 2020/0410770 A1 | 12/2020 | Choi et al. | |
| 2021/0012573 A1 | 1/2021 | Driancourt | |

FOREIGN PATENT DOCUMENTS

| | | |
|---|---|---|
| CN | 106385576 A | 2/2017 |
| KR | 10-2020-0100259 A | 8/2020 |
| KR | 10-2020-0108484 A | 9/2020 |
| KR | 10-2020-0137323 A | 12/2020 |
| KR | 10-2020-0138096 A | 12/2020 |
| KR | 10-2197615 B1 | 12/2020 |

* cited by examiner

METHOD AND APPARATUS FOR DISPLAYING AUGMENTED REALITY OBJECT

CROSS-REFERENCE TO RELATED APPLICATION(S)

This application is a continuation application, claiming priority under § 365(c), of an International application No. PCT/KR2022/001700, filed on Feb. 3, 2022, which is based on and claims the benefit of a Korean patent application number 10-2021-0019448, filed on Feb. 10, 2021, in the Korean Intellectual Property Office, the disclosure of which is incorporated by reference herein in its entirety.

TECHNICAL FIELD

The disclosure relates to a method and electronic device for displaying shared information based on augmented reality (AR).

BACKGROUND ART

Augmented reality (AR) may be technology that combines a virtual object or information with an existing environment so that the object or information is shown as if it originally existed in the environment. An electronic device for providing augmented reality may obtain, using a camera, a preview image of an object in reality, and may recognize (identify) the object in the reality. Based on the recognized object, the electronic device may display information (e.g., a virtual object) associated with augmented reality on the preview image. The augmented reality may be provided to a user via, for example, a game application or a camera application, and may be shared with another user.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Information may be unintentionally shared when electronic devices share information. This is an issue experienced in the augmented reality (AR) field. For example, in the case in which an electronic device records AR information to be superimposed on a scene of the real world at the field of view (FOV) falling within a designated range, if an electronic device which the information is to be shared with is not located/disposed accurately at the corresponding field of view and the corresponding scene, the electronic device is incapable of obtaining the corresponding AR information. Therefore, it is difficult to share the accurate location of a virtual object or the accurate number of virtual objects.

Aspects of the disclosure are to address at least the above-mentioned problems and/or disadvantages and to provide at least the advantages described below. Accordingly, an aspect of the disclosure is to provide a method and electronic device for displaying shared information based on augmented reality AR.

Additional aspects will be set forth in part in the description which follows and, in part, will be apparent from the description, or may be learned by practice of the presented embodiments.

Technical Solution to Problem

In accordance with an aspect of the disclosure, an electronic device is provided. The electronic device includes a display, at least one sensor, at least one camera, and at least one processor operatively connected to the display, the at least one sensor, and the at least one camera, wherein the at least one processor is configured to execute an augmented reality (AR) application that uses the at least one camera, obtain a first image of surroundings of the electronic device using the at least one camera, obtain, using the at least one sensor, first sensing information including at least one of first posture information or first position information of the electronic device that correspond to the first image, produce a virtual object that is superimposed on the first image according to a user input while the first image is output to the display, obtain, based on the first image and the first sensing information, first identification information corresponding to the virtual object, obtain a second image that at least partially overlaps the first image using the at least one camera, obtain, using the at least one sensor, second sensing information including at least one of second posture information or second position information of the electronic device that correspond to the second image, obtain second identification information corresponding to the virtual object based on the second image and the second sensing information, and output the virtual object to the display, in response to a case in which information, obtained via the at least one sensor in a state in which the AR application is executed, corresponds to the second sensing information.

In accordance with another aspect of the disclosure, a method performed by an electronic device is provided. The operation method includes executing an augmented reality (AR) application that uses at least one camera, obtaining, using the at least one camera, a first image of surroundings of the electronic device, obtaining, using at least one sensor, first sensing information including at least one of first posture information or first position information of the electronic device that correspond to the first image, producing a virtual object that is superimposed on the first image according to a user input while the first image is output to a display, obtaining first identification information corresponding to the virtual object based on the first image and the first sensing information, obtaining, using the at least one camera, a second image that at least partially overlaps the first image, obtaining, using the at least one sensor, second sensing information including at least one of second posture information or second position information of the electronic device that correspond to the second image, obtaining second identification information corresponding to the virtual object based on the second image and the second sensing information, and outputting the virtual object to the display in response a case in which information, obtained via at least one sensor in a state in which the AR application is executed, corresponds to the second sensing information.

In accordance with another aspect of the disclosure, an electronic device is provided. The electronic device includes a communication module, a display, at least one sensor, at least one camera, and at least one processor operatively connected to the communication module, the display, the at least one sensor, and the at least one camera, wherein the at least one processor is configured to execute an augmented reality (AR) application that uses the at least one camera, obtain a first image of surroundings of the electronic device using the at least one camera, obtain, using the at least one sensor, first sensing information including at least one of first posture information or first position information of the electronic device that correspond to the first image, produce a virtual object that is superimposed on the first image according to a user input while the first image is output to the display, obtain first identification information corresponding to the virtual object based on the first image and the first sensing information, obtain, using the at least one camera, a second image that at least partially overlaps the first image, obtain, using the at least one sensor, second sensing information including at least one of second posture information or second position information of the electronic device that correspond to the second image, obtain second identification information corresponding to the virtual object based on the second image and the second sensing information, transmit the first identification information and the second identification information to a server via the communication module, to receive the first identification information and the second identification information from the server, and output the virtual object to the display in response to in a case in which information, obtained via the at least one camera and the at least one sensor in a state in which the AR application is executed, corresponds to the second identification information.

Advantageous Effects of Invention

According to various embodiments of the disclosure, a method and an electronic device are capable of obtaining more information associated with the location of the electronic device and scene information associated with an object to be shared in the AR field, and are capable of accurately outputting the location of the object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, or structure.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

Figure 1:
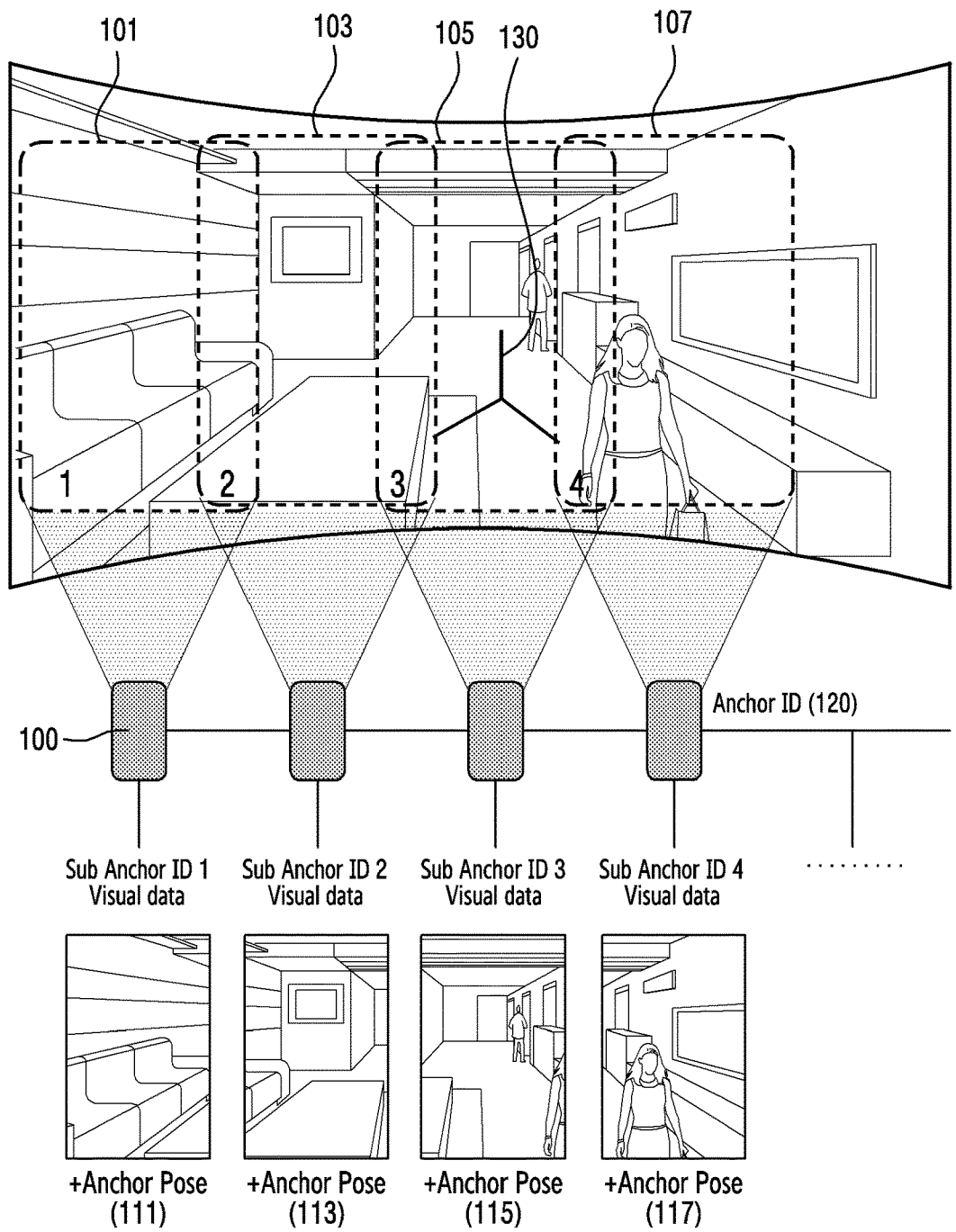
FIG. 1 is a diagram illustrating an operation of obtaining a plurality of images by an electronic device as the electronic device moves, according to an embodiment of the disclosure.

FIG. 1 is a diagram illustrating an operation of obtaining a plurality of images by an electronic device as the electronic device moves, according to an embodiment of the disclosure.

Referring to FIG. 1, the electronic device 100 according to an embodiment may display an image on a display based on execution of an augmented reality (AR) application. For example, the image may include a preview image that is obtained via a camera.

According to an embodiment, the electronic device 100 may obtain a plurality of images via a camera as the electronic device 100 moves in the state in which an AR application is executed. For example, the electronic device 100 may obtain a first image 101, a second image 103, a third image 105, and a fourth image 107 as the electronic device 100 moves. According to an embodiment, an image obtained as the electronic device 100 moves may at least partially overlap an image that has been obtained immediately before the corresponding image is obtained. For example, the second image 103 may at least partially overlap the first image 101, the third image 105 may at least partially overlap the second image 103, and the fourth image 107 may at least partially overlap the third image 105. According to an embodiment, images obtained as the electronic device 100 moves may not overlap each other. For example, at least two images among the first image 101, the second image 103, the third image 105, and the fourth image 107 may not overlap each other, and may include an area corresponding to the movement trajectory of the electronic device 100.

According to an embodiment, while an image is output, the electronic device 100 may produce a virtual object that is displayed in a manner of being superimposed on the image according to a user input. According to an embodiment, the electronic device 100 may display, based on a user input, a virtual object on the display in the form of an image or text.

According to an embodiment, the electronic device 100 may obtain posture information and/or position information of the electronic device 100 that correspond to each of a plurality of images obtained via a camera. According to an embodiment, the electronic device 100 may detect a posture of the electronic device 100 or a change of the posture via a sensor. According to an embodiment, using a gyro sensor (or a gyroscope), a gravity sensor, a geomagnetic sensor, or an acceleration sensor, or a combination of at least two thereof, the electronic device 100 may sense the rotation of the electronic device 100, a change of the orientation of the electronic device 100, or the degree of slope of the electronic device 100. According to an embodiment, using a position detection sensor and position coordinates 130, the electronic device 100 may sense the location of the electronic device 100.

According to an embodiment, the electronic device 100 may obtain pieces of identification information respectively corresponding to a plurality of images obtained via a camera. For example, the electronic device 100 may obtain first identification information 111 corresponding to the first image 101, second identification information 113 corresponding to the second image 103, third identification information 115 corresponding to the third image 105, and fourth identification information 117 corresponding to the fourth image 107.

According to an embodiment, the plurality of pieces of identification information may include sensing information of the electronic device 100 and scene information including information associated with a virtual object, which respectively correspond to images. The plurality of pieces of identification information may include sub-identification information. In addition, a plurality of pieces of sub-identification information may be information associated with a single piece of main identification information.

For example, the main identification information may include sensing information of the electronic device 100 and scene information including information associated with a virtual object, which corresponds to an image that obtained for the first time. As another example, main identification information may include sensing information of the electronic device 100 and scene information including information associated with a virtual object, which correspond to an image including a largest number of feature points or having the highest definition.

In addition, as an example of sub-identification information, the sub identification information may include sensing information of the electronic device 100 and scene information including information associated with a virtual object, which correspond to an image which is different from an image that is obtained for the first time. As another example, the sub identification information may include sensing information of the electronic device 100 and scene information including information associated with a virtual object, which correspond to an image different from an image including a largest number of feature points or having the highest definition.

According to an embodiment, the electronic device 100 may store the pieces of sub-identification information 111, 113, 115, and 117 by merging the same with a single piece of main identification information 120. According to the above-described example, the electronic device 100 may process the sub-identification information by merging the same with the single piece of main identification information 120, and thus, may efficiently use and manage data.

Figure 2:
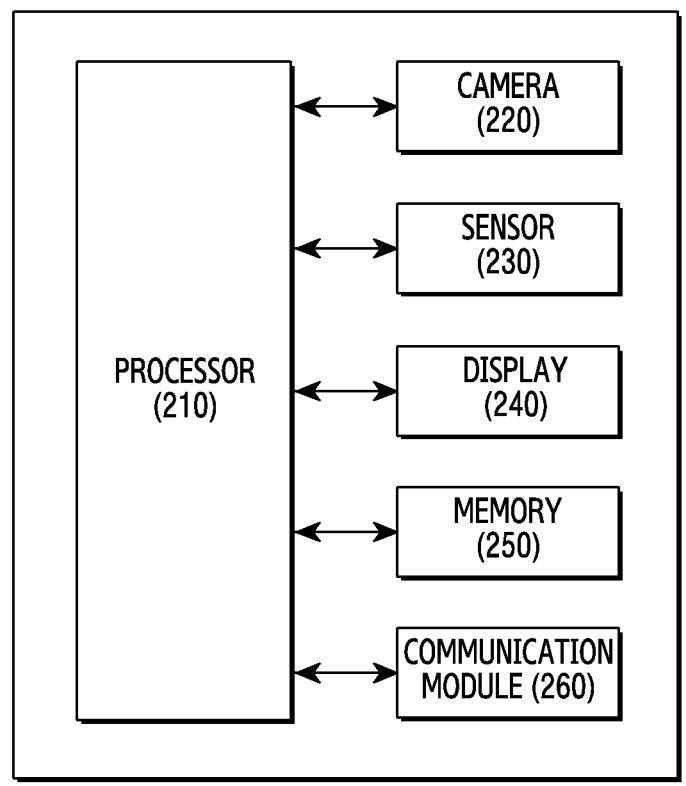
FIG. 2 is a block diagram of an electronic device according to an embodiment of the disclosure.

FIG. 2 is a block diagram of an electronic device according to an embodiment of the disclosure.

Referring to FIG. 2, the electronic device 100 may include a processor 210, a camera 220, a sensor 230, a display 240, a memory 250, and/or a communication module 260. According to various embodiments, the electronic device 100 may include an additional element in addition to the elements illustrated in FIG. 2, or may omit at least one of the elements illustrated in FIG. 2.

According to an embodiment, using instructions stored in the memory 250, the processor 210 may execute operations or data processing associated with control and/or communication of at least one other element of the electronic device 100. According to an embodiment, the processor 210 may include at least one of a central processing unit (CPU), a graphics processing unit (GPU), a micro controller unit (MCU), a sensor hub, a supplementary processor, a communication processor, an application processor, an application specific integrated circuit (ASIC), or a field programmable gate arrays (FPGA), and may include a plurality of cores.

According to an embodiment, the processor 210 may execute an application (e.g., an AR application) stored in the memory 250. According to an embodiment, the processor 210 may obtain an image using a camera 220 in the state in which am AR application is executed. According to an embodiment, the processor 210 may provide an AR object superimposed on or floating on an image in the state in which the AR application is executed. The application described in the specifications is not limited to an AR application and may include an application that uses the camera 220.

According to an embodiment, the processor 210 may analyze an image in order to determine a position (e.g., coordinates) at which an AR object is to be displayed. For example, the processor 210 may distinguish an object (e.g., a person) and a background included in the image, or may extract feature points associated with the image. According to an embodiment, based on the extracted feature points, the processor 210 may identify (or recognize) the eyes, the noise, the mouth, the head, the body, or a gesture (or a posture) of a person included in the image. According to an embodiment, the processor 210 may display an AR object corresponding to the configuration of the image (e.g., a background, a person, a gesture) at a position corresponding to the configuration.

According to an embodiment, based on obtaining (or shooting) of an image (e.g., a still image and a moving image or video) via an AR application, the processor 210 may store the image and information associated with an AR object related to the image together in the memory 250. For example, information associated with an AR object related to a video may include the type and coordinates of the AR object to be displayed at each frame of the video. Detailed content related to operation of the processor 210 will be described later with reference to FIG. 4.

According to an embodiment, the camera 220 may obtain (or acquire or shoot) an image (e.g., a still image and a video). For example, an image signal processor (not illustrated) electrically connected to the camera 220 may distinguish an object (e.g., a person) and a background included in an image (e.g., a preview image or an image stored in the memory 250). The image signal processor may extract feature points related to the image (e.g., a preview image or an image stored in the memory 250). According to an embodiment, the feature points may be used for identifying (or recognizing) the face (e.g., the eyes, noise, mouth, or the like) or a gesture (or posture) of a person included in the image. The image signal processor may be embodied as an entity separated from the camera 220, or may be embodied as a part of the processor 210. According to an embodiment, the camera 220 may include an image sensor. According to an embodiment, the image sensor may obtain and process color information.

According to an embodiment, the sensor 230 may sense at least one sensor of the posture and position of the electronic device 100. According to an embodiment, the sensor 230 may measure a physical quantity, and may convert the same into an electric signal or may produce a data value. According to an embodiment, using the electric signal or data value, the sensor 230 may detect the posture of the electronic device 100 and a change of the posture. According to an embodiment, the sensor 230 may include at least one of a gyro sensor (or gyroscope), a gravity sensor, a geomagnetic sensor, or an acceleration sensor. According to various embodiments, the gyro sensor, the gravity sensor, the geomagnetic sensor, the acceleration sensor, or a combination of at least two thereof may perform operations of the sensor 230 by sensing the rotation of the electronic device 100, a change in the orientation of the electronic device 100, or the degree of slope of the electronic device 100.

According to an embodiment, the sensor 230 may be operatively connected to the processor 210, the camera 220, or the memory 250, and may perform processing associated with color information, three dimensional (3D) information, distance information, or position information.

According to an embodiment, the communication module 260 may establish a communication link between the electronic device 100 and an external electronic device (e.g., a server related to provision of an AR object), and may perform communication via the established communication link. According to an embodiment, the communication module 260 may transmit, to a server, sensing information including at least one piece of information among the posture information and position information of the electronic device 100, scene information obtained via the camera 220, and/or virtual object information produced according to a user input. According to an embodiment, the communication module 260 may receive, from a server, sensing information including at least one piece of posture information and position information of the electronic device 100, scene information obtained via the camera 220, and/or virtual object information produced according to a user input.

The display 240 according to an embodiment may display an image obtained via the camera 220. According to an embodiment, the display 240 may display an AR object superimposed on or floating on an image. According to an embodiment, the electronic device 100 may obtain a user input via the display 240, and may transfer the user input to the processor 210.

According to an embodiment, the memory 250 may be a set of one or more memories. According to an embodiment, the memory 250 may store data and/or commands received from other elements (e.g., the processor 210, the camera 220, the sensor 230, the display 240, or the communication module 260) or produced by the other elements. According to various embodiments, the memory 250 may store an application (e.g., an AR application) that uses the camera 220. According to an embodiment, the memory 250 may store a plurality of AR objects.

Figure 3:
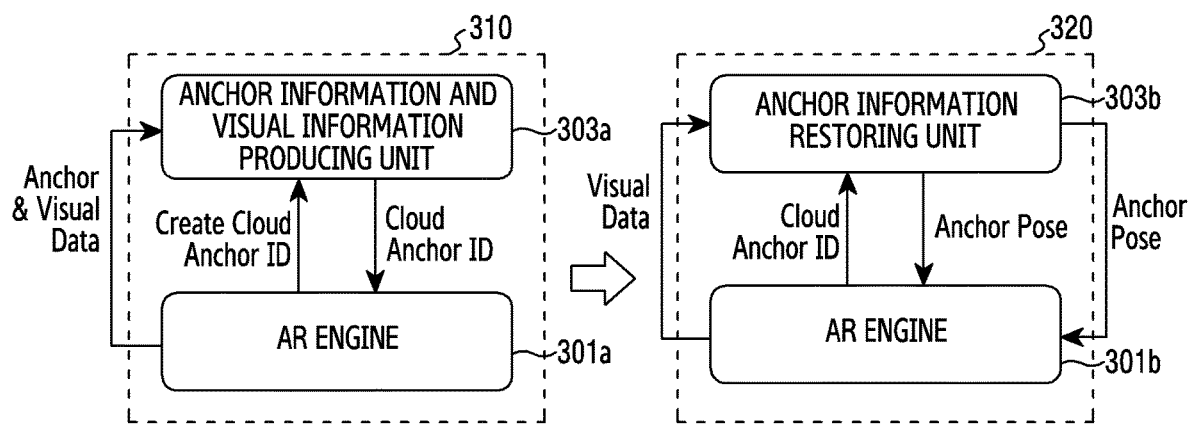
FIG. 3 is a diagram illustrating an operation of producing and restoring identification information by an electronic device according to an embodiment of the disclosure.

FIG. 3 is a diagram illustrating an operation of producing and restoring identification information by an electronic device according to an embodiment of the disclosure.

Referring to FIG. 3, a first electronic device 310 (e.g., a host device) according to an embodiment may produce identification information. According to an embodiment, the first electronic device 310 may include an AR engine 301*a* and an anchor information (or spatial information) and visual information (or scene information) producing unit 303*a*. According to an embodiment, the electronic device 100 of FIG. 1 may be referred to as the first electronic device 310 of FIG. 3.

According to an embodiment, the AR engine 301*a* may obtain information related to a preview image from the camera 220. According to an embodiment, the AR engine 301*a* may perform at least one operation among 6 degree of freedom (DoF) tracking or obtaining of point cloud. The point cloud may be a set of a plurality of points located in a 3D space.

According to an embodiment, the AR engine 301*a* in the first electronic device 310 may transmit the obtained preview image information to the anchor information and visual information producing unit 303*a*. According to an embodiment, the AR engine 301*a* may transmit, to the anchor information and visual information producing unit 303*a*, rotation information of the first electronic device 310 and the position information of first electronic device 310 obtained via 6DoF tracking. According to an embodiment, the AR engine 301*a* may transmit the obtained point cloud to the anchor information and visual information producing unit 303*a*.

According to an embodiment, the anchor information and visual information producing unit 303*a* may transmit anchor information and visual information to a cloud anchor service. According to an embodiment, anchor information may include 6-axis sensor information and/or 3D coordinate information obtained from an inertial sensor (an inertial measurement unit (IMU)). According to an embodiment, the visual information may include the number of feature points included in an image obtained via the camera 220 and/or a 3D point cloud.

According to an embodiment, the second electronic device 320 (e.g., a client device) may restore identification information. According to an embodiment, the second electronic device 320 may include the AR engine 301*b* and the anchor information restoring unit 303*b*.

According to an embodiment, the AR engine 301*b* may perform at least one operation among obtaining of preview image information, 6DoF tracking, or obtaining of a point cloud.

According to an embodiment, the AR engine 301*b* in the second electronic device 320 may transmit obtained preview image information to the anchor information restoring unit 303*b*. According to an embodiment, the AR engine 301*b* may transmit an obtained point cloud to the anchor information restoring unit 303*b*.

According to an embodiment, based on visual information (e.g., feature points, a 3D point cloud) received from the AR engine 301*b* and identification information received from a cloud anchor service, the anchor information restoring unit 303*b* may restore spatial information (or anchor information). According to an embodiment, the anchor information restoring unit 303*b* and may transmit anchor information to the AR engine 301*b*.

Figure 4:
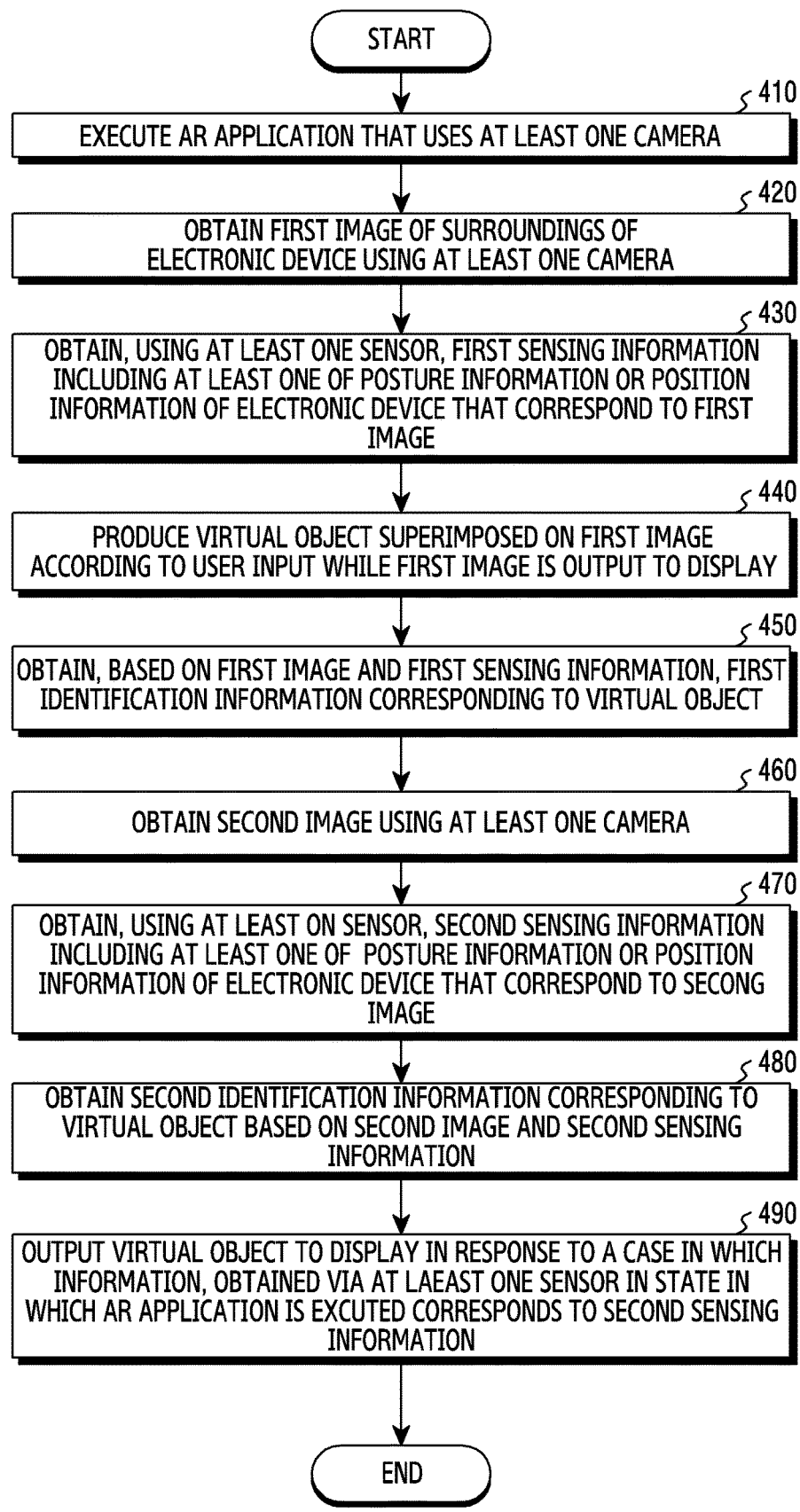
FIG. 4 is a flowchart illustrating an operation of obtaining, based on sensing information, identification information by an electronic device according to an embodiment of the disclosure.

FIG. 4 is a flowchart illustrating an operation of obtaining, based on sensing information, identification information by an electronic device according to an embodiment of the disclosure.

Referring to FIG. 4, the processor 210 according to an embodiment may execute an AR application using at least one camera 220 in operation 410. According to an embodiment, the processor 210 may execute an AR program or application stored in the memory 250. For example, the processor 210 may execute an application including a computer program, an application program interface (API), or embedded software which is capable of executing instructions or an operation of transmitting or receiving AR image or information among a plurality of users. The AR application described in the specifications is an application that uses the camera 220. For example, the AR application may be an application that includes a function of adding a visual object to an image shot via a camera and displaying the same.

According to an embodiment, the processor 210 may obtain a first image of surroundings of the electronic device using at least one camera 220 in operation 420. According to an embodiment, the processor 210 may shoot a real object (e.g., furniture, electronic appliances, a wall, a background) via the camera 220, and may provide, via the display 240, the first image that is shot in real time. For example, the real object may be a subject. According to an embodiment, the processor 210 may display the first image obtained via the camera 220 on the display 240 as a preview image. According to an embodiment, the processor 210 may obtain information associated with a space included in the first image using a point cloud.

According to an embodiment, the processor 210 may obtain first sensing information (e.g., the position information and/or posture information of the electronic device 100) including at least one of posture information or position information of the electronic device that correspond to the first image using at least one sensor in operation 430. According to an embodiment, the processor 210 may obtain information associated with the position and the posture of the electronic device 100 via the sensor 230. According to an embodiment, the processor 210 may obtain, from a global positioning system (GPS) module, information associated with the position of the electronic device 100. According to an embodiment, the processor 210 may obtain, from a motion sensor (or an inertial sensor), information associated with the posture of the electronic device 100. For example, information associated with the posture of the electronic device 100 may include the orientation of the electronic device 100 and the degree of slope of the electronic device 100. The information associated with the posture of the electronic device 100 is not limited to the above-described example. According to an embodiment, the processor 210 may obtain, from a motion sensor in real time, information associated with the posture of the electronic device 100.

According to an embodiment, the processor 210 may produce a virtual object that is superimposed on the first image according to a user input, while the first image is output to the display, in operation 440. According to an embodiment, the processor 210 may display, based on a user input, the virtual object on the display 240 in the form of an image or text. For example, the processor 210 may output, to the display 240, a virtual object including at least one of two dimensional (2D) text, a 2D image, 3D text, a 3D image, or a 3D video. According to an embodiment, the processor 210 may display a virtual object to be superimposed on a real object included in the first image according to a see-through scheme. However, the disclosure is not limited to the example, and the processor 210 may provide a virtual object according to a see-closed scheme.

According to the above-described embodiment, the electronic device 100 may display, on a screen, a virtual object image corresponding to a virtual element or a virtual object that is embodied as if it existed in the real word although it does not actually exist in the real world, and may enable a user to perform interaction with the virtual element or virtual object displayed on the screen, so as to support the user to have a unique experience that is difficult for the user to have in the real world.

According to an embodiment, the processor 210 may obtain first identification information corresponding to the virtual object based on the first image and the first sensing information in operation 450. According to an embodiment, the processor 210 may obtain the first identification information based on scene information corresponding to the first image and the first sensing information (e.g., the position information and/or posture information of the electronic device 100). According to an embodiment, the processor 210 may store the obtained first identification information in the memory 250. According to an embodiment, the processor 210 may transmit the obtained first identification information to a server via the communication module 260. For example, the processor 210 may connect the electronic device 100 and an external electronic device using a peer-to-peer (P2P) type 5th generation (5G) network communication scheme via the communication module 260. As another example, the processor 210 may connect the electronic device 100 and an external electronic device using a short-range communication module. The method in which processor 210 connects the electronic device 100 and an external electronic device is not limited to the above-described example.

According to an embodiment, the processor 210 may obtain a second image that at least partially overlaps the first image, using at least one camera 220 in operation 460. According to an embodiment, FIG. 4 illustrates that operation 460 is performed before operation 440, the disclosure is not limited thereto. For example, operation 460 may be performed before operation 440, or operation 440 and operation 460 may performed at substantially the same time (e.g., in parallel).

According to an embodiment, the processor 210 may display the second image obtained via the camera 220 on the display 240 as a preview image. According to an embodiment, the processor 210 may obtain information associated with a space included in the second image using a point cloud.

According to an embodiment, the processor 210 may obtain second sensing information including at least one of posture information and position information of the electronic device that correspond to the second image using at least one sensor in operation 470. According to an embodiment, the processor 210 may obtain the second sensing information in a similar manner as the method of obtaining the first sensing information.

According to an embodiment, the processor 210 may obtain information associated with a changed position and a changed posture of the electronic device 100 via the sensor 230. According to an embodiment, the processor 210 may obtain, from a GPS module, information associated with the position of the electronic device 100. According to an embodiment, the processor 210 may obtain, from a motion sensor (or an inertial sensor), information associated with the posture of the electronic device 100.

According to an embodiment, based on the second image and the second sensing information (e.g., the position information and/or posture information of the electronic device 100), the processor 210 may obtain second identification information corresponding to the virtual object in operation 480. According to an embodiment, if a change in the movement (e.g., rotation, translation) of the electronic device 100 falls within a designated range and if a range of overlap between the first image and the second image is less than a threshold value, the processor 210 may obtain the second identification information based on the second image and the second sensing information. For example, if the change of the movement of the electronic device 100 is greater than or equal to a first threshold value and less than a second threshold value, the processor 210 may determine that the range of overlap between the first image and the second image falls within a designated range. In addition, for example, if the number of feature points extracted from the second image that are identical to feature points extracted from the first image is less than or equal to a designated number, the processor 210 may determine that the range of overlap between the first image and the second image is less than a threshold value.

According to an embodiment, the processor 210 may store the obtained second identification information in the memory 250. According to an embodiment, the processor 210 may transmit the obtained second identification information to a server via the communication module 260.

According to an embodiment, in operation 490, the processor 210 may output the virtual object to the display in response to the fact that information obtained via the at least one sensor corresponds to the second sensing information in the state in which the AR application is executed. According to an embodiment, the processor 210 may output the virtual object to the display 240 based on the first identification information and/or second identification information stored in the memory 250 in the state in which the AR application is executed. For example, if it is determined that the sensing information obtained via the sensor 230 and scene information obtained via the camera 220 in the state in which the AR application is executed corresponds to at least one of the first identification information or the second identification information stored in the memory 250, the processor 210 may display the virtual object to the display 240. According to an embodiment, the processor 210 may identify a position where the virtual object is to be displayed. According to an embodiment, the processor 210 may determine a position where the virtual object is to be displayed based on the first identification information and the second identification information stored in the memory 250.

According to an embodiment, during the period of time in which the electronic device 100 operates in order to produce an AR image, the position and/or posture of the electronic device 100 may change. According to an embodiment, the processor 210 may identify the position and/or the posture of the electronic device 100 that changes during the period of time in which operation is performed to produce an AR image, and may display, on the display 240, the virtual object to correspond to the changed position and posture of the electronic device 100. According to an embodiment, in consideration of the amount of change made in the position and/or posture of the electronic device 100, the processor 210 may adjust a position where the virtual object is to be displayed. According to an embodiment, the processor 210 may adjust a position where a virtual image is to be displayed, so as to correspond to the position of an external object changed as the position and posture of the electronic device 100 changes. According to an embodiment, the processor 210 may display, on the display 240, the virtual object at an adjusted position.

According to another embodiment, an external electronic device may output a virtual object to a display based on first identification information and/or second identification information received via a communication module in the state in which an AR application is executed. According to an embodiment, the operation of outputting the virtual object to the external electronic device may be performed in the same manner as or in a similar manner to the operation of outputting a virtual object to the electronic device 100.

According to an embodiment, the external electronic device may detect information related to an external object (e.g., the feature of the external object) from an image obtained via a camera in the state in which the AR application is executed. According to an embodiment, if it is determined that the detected information related to the external object corresponds to the first identification information and/or second identification information received from the server, the external electronic device may output the virtual object to the display.

According to an embodiment, based on the first identification information and/or second identification information, the external electronic device may determine a position where the virtual object is to be displayed on the display, so as to display the virtual object to correspond (be mapped) to the external object shown (or displayed) on the display of the external electronic device. According to an embodiment, the external electronic device may display the virtual object at the determined position on the display.

Figure 5A:
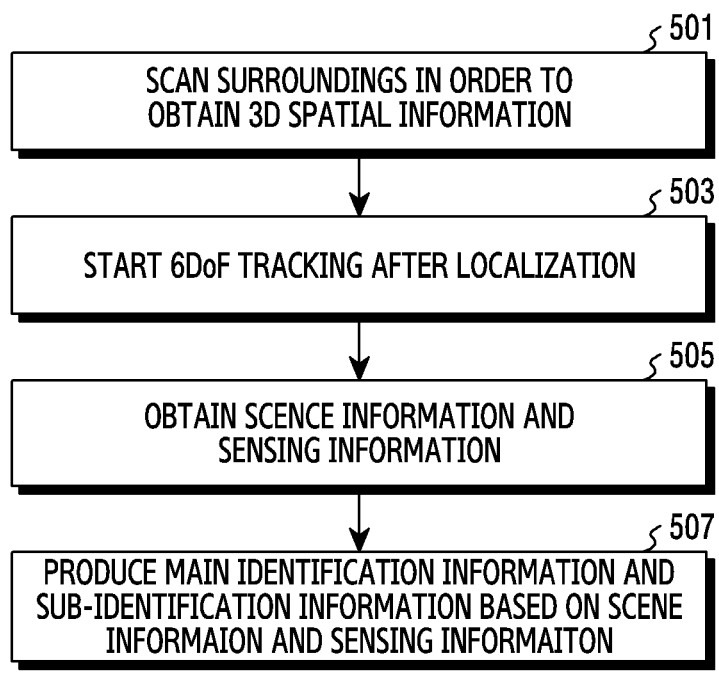
FIG. 5A is a flowchart illustrating an operation of producing identification information by an electronic device according to an embodiment of the disclosure.

FIG. 5A is a flowchart illustrating a process of producing identification information by an electronic device according to an embodiment of the disclosure. The content of FIG. 5A that is similar to the above-described content or redundant content will be briefly described or will be omitted.

Referring to FIG. 5A, the electronic device 100 according to an embodiment may scan the surroundings of the electronic device 100 in order to obtain 3D spatial information in operation 501. According to an embodiment, based on a preview image obtained via the camera 220, an inertial sensor (an inertial measurement unit (IMU)), GPS information, or azimuth information, the electronic device 100 may obtain 3D spatial information of the surroundings of the electronic device 100. According to an embodiment, the electronic device 100 may obtain the 3D spatial information of the surroundings of the electronic device 100 in the state in which an AR application is executed.

According to an embodiment, the electronic device 100 may start 6 degree of freedom (6DoF) tracking after completing localization in operation 503. According to an embodiment, localization may include determining of the position and orientation of the camera 220, and 6DoF tracking may include tracking the rotation of the electronic device 100 and the position of the electronic device 100.

According to an embodiment, the electronic device 100 may obtain scene information and sensing information as the electronic device 100 moves in operation 505. According to an embodiment, the electronic device 100 may obtain scene information based on an image obtained via the camera 220 and sensing information obtained via the sensor 230. According to an embodiment, the scene information may include information associated with an object included in an image. For example, the electronic device 100 may obtain scene information that distinguishes an object (e.g., a subject) and a background included in an image, and includes feature points extracted from the image. According to an embodiment, the sensing information may include the position information and the posture information of the electronic device 100. According to an embodiment, based on the movement of the electronic device 100, the electronic device 100 may obtain information associated with the rotation of the electronic device 100, a change in the orientation of the electronic device 100, or the degree of slope of the electronic device 100.

According to an embodiment, based on the scene information and sensing information, the electronic device 100 may produce main identification information and sub-identification information in operation 507. According to an embodiment, based on scene information and sensing information obtained based on a first image, the electronic device 100 may produce main identification information. According to an embodiment, based on scene information and sensing information obtained based on a second image different from the first image, the electronic device 100 may produce sub identification information. According to an embodiment, the electronic device 100 may produce a plurality of pieces of sub-identification information based on a plurality of images. According to an embodiment, the electronic device 100 may merge at least one piece of sub-identification information with the main identification information, and may store the same.

Figure 5B:
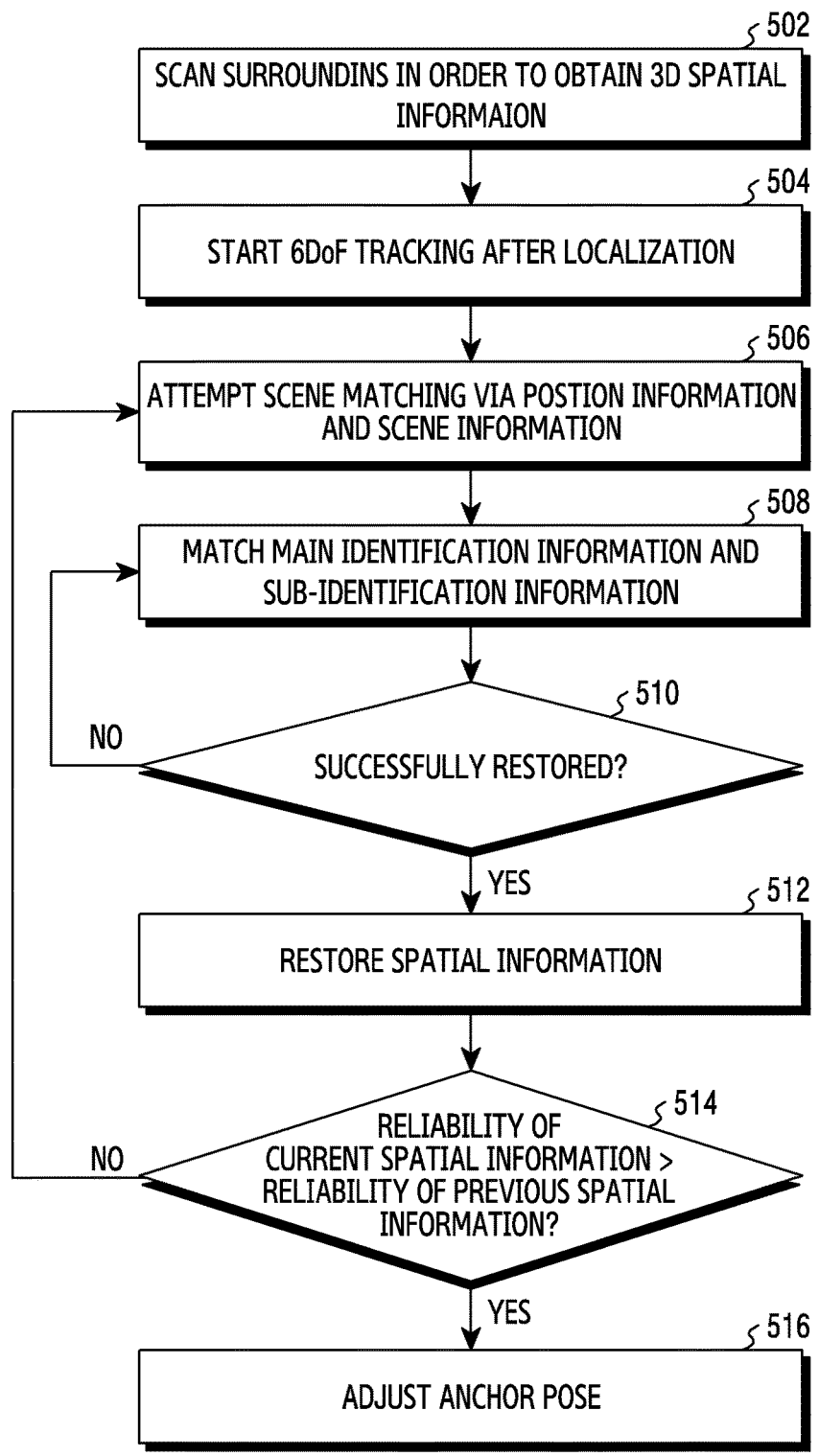
FIG. 5B is a flowchart illustrating an operation of restoring identification information by an electronic device according to an embodiment of the disclosure.

FIG. 5B is a flowchart illustrating a process of restoring identification information by an electronic device according to an embodiment of the disclosure. The content of FIG. 5B that is similar to the above-described content or redundant content will be briefly described or will be omitted.

Referring to FIG. 5B, the electronic device according to an embodiment may scan surroundings in order to obtain 3D spatial information in operation 502. According to various embodiments, the electronic device may include an electronic device (e.g., the electronic device 100 of FIG. 1) that produces identification information, or an external electronic device. According to an embodiment, based on a preview image obtained via a camera, an inertial sensor (e.g., an inertial measurement unit (IMU)), GPS information, or azimuth information, the electronic device may obtain 3D spatial information of the surroundings of the electronic device. According to an embodiment, the electronic device may obtain the 3D spatial information of the surroundings of the electronic device in the state in which an AR application is executed.

According to an embodiment, the electronic device may start 6 degree of freedom (6DoF) tracking after completing localization in operation 504. According to an embodiment, localization may include determining of the position and orientation of the camera, and 6DoF tracking may include tracking the rotation of the electronic device and the position of the electronic device.

According to an embodiment, the electronic device 100 may attempt scene matching based on sensing information and scene information in operation 506. According to an embodiment, the electronic device 100 may determine a scene corresponding to sensing information and scene information stored in the memory 250 in the state in which the AR application that operates the camera 220 is executed. For example, the electronic device 100 may determine a scene corresponding to GPS information and image information (e.g., a still image, a dynamic image) stored in the memory 250. According to another embodiment, the external electronic device may determine a scene corresponding to sensing information and scene information received from a server in the state in which an AR application that operates a camera is executed. For example, the electronic device 100 may determine a scene corresponding to GPS information and image information received from a server.

According to an embodiment, the electronic device 100 may match main identification information and sub-identification information in operation 508. According to an embodiment, in the state in which the AR application is executed, even when scene information corresponding to main identification information stored in the memory 250 is not obtained, if the electronic device 100 obtains scene information corresponding to sub-identification information stored in the memory 250, the electronic device 100 may match the obtained scene information to main identification information. According to another embodiment, in the state in which an AR application is executed, even when scene information corresponding to main identification information received from a server is not obtained, if the external electronic device obtains scene information corresponding to sub-identification information received from the server, the external electronic device may match the obtained scene information to main identification information.

According to an embodiment, the electronic device 100 may determine whether spatial information is successfully restored in operation 510. According to an embodiment, based on information corresponding to main identification information and sub-identification information stored in the memory 250 in the state in which the AR application that operates the camera 220 is executed, the electronic device 100 may determine whether the spatial information is successfully restored. According to another embodiment, the external electronic device may determine whether spatial information is successfully restored based on main identification information and sub-identification information received from the server in the state in which the AR application that operates the camera is executed.

According to an embodiment, if it is determined that the spatial information is successfully restored, the electronic device 100 may restore spatial information in operation 512. According to an embodiment, the electronic device 100 may produce information corresponding to main identification information and sub-identification information stored in the memory 250 in the state in which the AR application that operates the camera 220 is executed. For example, the electronic device 100 may produce a virtual object determined based on the main identification information and sub-identification information stored in the memory 250 in the state in which the AR application is executed. According to another embodiment, the external electronic device may produce information corresponding to main identification information and sub-identification information received from the server in the state in which the AR application that operates the camera is executed. For example, the external electronic device may produce a virtual object determined based on the main identification information and sub-identification information received from the server in the state in which the AR application is executed.

According to an embodiment, if it is determined that spatial information is not successfully restored, the electronic device 100 may return to operation 508, and may match the main identification information and the sub-identification information.

According to an embodiment, the electronic device 100 may determine whether the reliability of current spatial information is higher than the reliability of previous spatial information in operation 514. According to an embodiment, the reliability of the spatial information may include the number of feature points included in an image obtained via the camera 220 and information related to definition. For example, if the number of feature points included in the image obtained via the camera 220 is high, the electronic device 100 may determine that the reliability of the spatial information is high. In addition, for example, if definition of the image obtained via the camera 220 is high, the electronic device 100 may determine that the reliability of the spatial information is high. According to an embodiment, the electronic device 100 may determine whether the reliability (or accuracy) of the depth information or position information of currently obtained spatial information is higher than the reliability (or accuracy) the depth information or the position information of previous spatial information.

According to an embodiment, if it is determined that the reliability of the current spatial information is higher than the reliability of the previous spatial information, the electronic device 100 may adjust the spatial information in operation 516. According to an embodiment, with reference to other identification information, the electronic device 100 may adjust errors of spatial information that may occur when a plurality of pieces of identification information are restored. The process in which the electronic device 100 adjusts spatial information will be described in detail with reference to FIG. 6.

According to an embodiment, if it is determined that the reliability of the current spatial information is lower than the reliability of the previous spatial information, the electronic device 100 may return to operation 506 and may perform operations 506 to 514.

Figure 6:
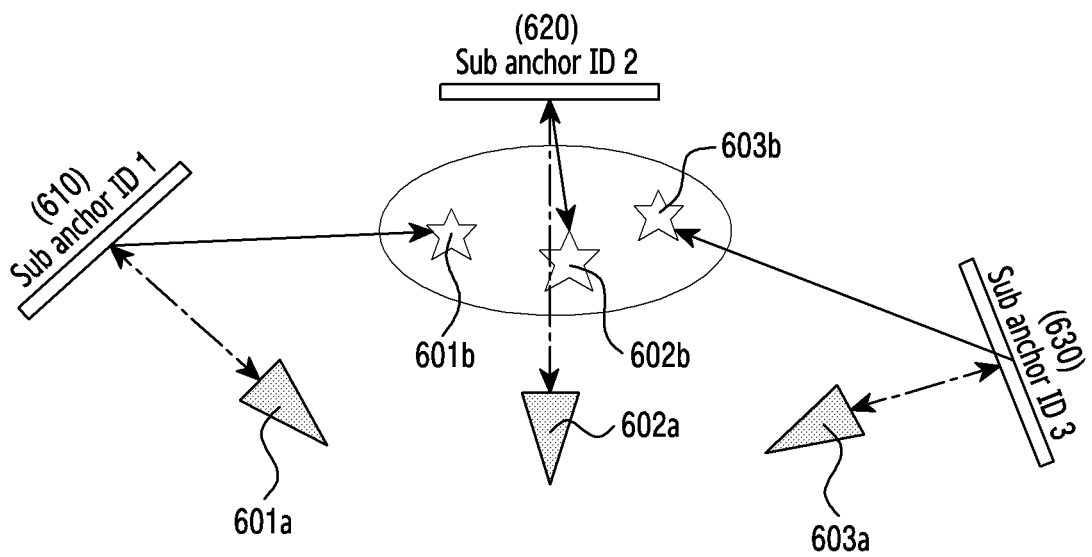
FIG. 6 is a diagram illustrating an operation of adjusting spatial information using a plurality of pieces of identification information, by an electronic device according to an embodiment of the disclosure.

FIG. 6 is a diagram illustrating an operation of adjusting spatial information using a plurality of pieces of identification information, by an electronic device according to an embodiment of the disclosure.

Referring to FIG. 6, the processor 210 according to an embodiment may obtain pieces of identification information respectively corresponding to a plurality of images obtained via the camera 220. According to an embodiment, the electronic device 100 may obtain first identification information 610 corresponding to a first image, second identification information 620 corresponding to a second image, and third identification information 630 corresponding to a third image. For example, the first identification information 610 may include spatial information 601*a* corresponding to a first FOV and first AR object information 601*b*. In addition, for example, the second identification information 620 may include spatial information 602*a* corresponding to a second FOV and second AR object information 602*b*. In addition, for example, the third identification information 630 may include spatial information 603*a* corresponding to a third FOV and third AR object information 603*b*.

According to an embodiment, each of the plurality of pieces of identification information 610, 620, and 630 may include posture information, position information, and scene information of the electronic device 100 corresponding to each image.

According to an embodiment, the processor 210 may spatially adjust an image using a plurality of pieces of identification information 610, 620, and 630 corresponding to a plurality of images. According to an embodiment, with reference to other identification information, the processor 210 may adjust errors of spatial information that may occur when a plurality of pieces of identification information are restored. For example, if the processor 210 restores the first identification information 610 stored in the memory 250 in the state in which an AR application that operates the camera 220 is executed, the processor 210 may adjust the spatial information using the second identification information 620 and/or third identification information 630. In addition, for example, if an external electronic device restores the first identification information 610 received from a server in the state in which an AR application is executed, the external electronic device may adjust spatial information using the second identification information 620 and/or third identification information 630.

Figure 7:
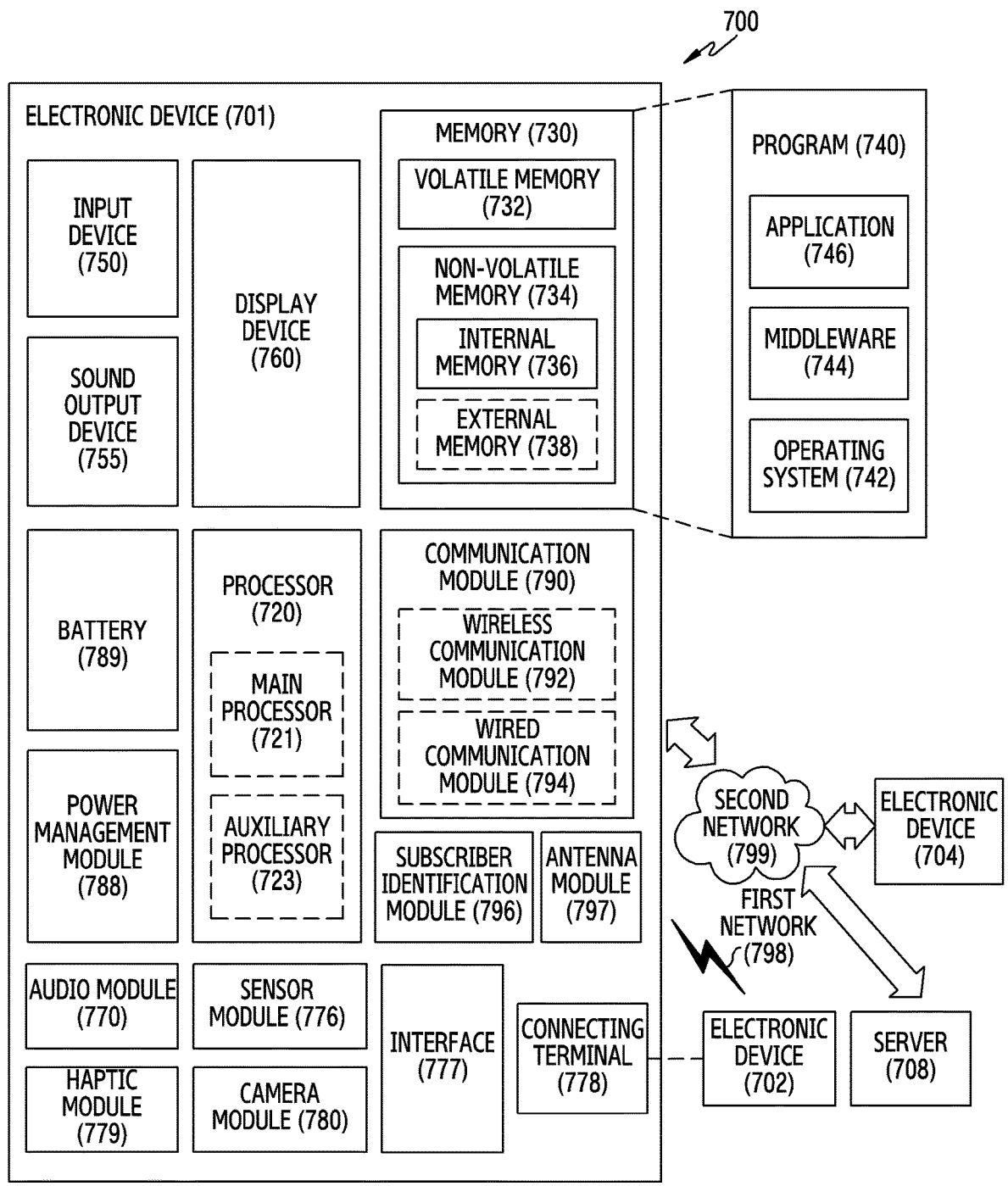
FIG. 7 is a block diagram illustrating an electronic device in a network environment according to an embodiment of the disclosure.

FIG. 7 is a block diagram illustrating an electronic device 701 in a network environment 700 according to an embodiment of the disclosure.

Referring to FIG. 7, the electronic device 701 in the network environment 700 may communicate with an electronic device 702 via a first network 798 (e.g., a short-range wireless communication network), or at least one of an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input module 750, a sound output module 755, a display module 760, an audio module 770, a sensor module 776, an interface 777, a connecting terminal 778, a haptic module 779, a camera module 780, a power management module 788, a battery 789, a communication module 790, a subscriber identification module (SIM) 796, or an antenna module 797. In some embodiments, at least one of the components (e.g., the connecting terminal 778) may be omitted from the electronic device 701, or one or more other components may be added in the electronic device 701. In some embodiments, some of the components (e.g., the sensor module 776, the camera module 780, or the antenna module 797) may be implemented as a single component (e.g., the display module 760).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may store a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), or an auxiliary processor 723 (e.g., a graphics processing unit (GPU), a neural processing unit (NPU), an image signal processor (ISP), a sensor hub processor, or a communication processor (CP)) that is operable independently from, or in conjunction with, the main processor 721. For example, when the electronic device 701 includes the main processor 721 and the auxiliary processor 723, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display module 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723. According to an embodiment, the auxiliary processor 723 (e.g., the neural processing unit) may include a hardware structure specified for artificial intelligence model processing. An artificial intelligence model may be generated by machine learning. Such learning may be performed, e.g., by the electronic device 701 where the artificial intelligence is performed or via a separate server (e.g., the server 708). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input module 750 may receive a command or data to be used by another component (e.g., the processor 720) of the electronic device 701, from the outside (e.g., a user) of the electronic device 701. The input module 750 may include, for example, a microphone, a mouse, a keyboard, a key (e.g., a button), or a digital pen (e.g., a stylus pen).

The sound output module 755 may output sound signals to the outside of the electronic device 701. The sound output module 755 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 760 may visually provide information to the outside (e.g., a user) of the electronic device 701. The display module 760 may include, for example, a display, a hologram device, or a projector and control circuitry to control a corresponding one of the display, hologram device, and projector. According to an embodiment, the display module 760 may include a touch sensor adapted to detect a touch, or a pressure sensor adapted to measure the intensity of force incurred by the touch.

The audio module 770 may convert a sound into an electrical signal and vice versa. According to an embodiment, the audio module 770 may obtain the sound via the input module 750, or output the sound via the sound output module 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The wireless communication module 792 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 792 may support a high-frequency band (e.g., the mmWave band) to achieve, e.g., a high data transmission rate. The wireless communication module 792 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 792 may support various requirements specified in the electronic device 701, an external electronic device (e.g., the electronic device 704), or a network system (e.g., the second network 799). According to an embodiment, the wireless communication module 792 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., a printed circuit board (PCB)). According to an embodiment, the antenna module 797 may include a plurality of antennas (e.g., array antennas). In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

According to various embodiments, the antenna module 797 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 or 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, mobile edge computing (MEC), or client-server computing technology may be used, for example. The electronic device 701 may provide ultra low-latency services using, e.g., distributed computing or mobile edge computing. In another embodiment, the external electronic device 704 may include an internet-of-things (IoT) device. The server 708 may be an intelligent server using machine learning and/or a neural network. According to an embodiment, the external electronic device 704 or the server 708 may be included in the second network 799. The electronic device 701 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, an electronic device (e.g., the electronic device 100 of FIG. 1) according to an embodiment may include a display (e.g., the display 240 of FIG. 2), at least one sensor (e.g., the sensor 230 of FIG. 2), at least one camera (e.g., the camera 220 of FIG. 2), and at least one processor (e.g., the processor 210 of FIG. 2) operatively connected to the display, the at least one sensor, and the at least one camera, wherein the at least one processor is configured to execute an augmented reality (AR) application that uses the at least one camera, obtain a first image of surroundings of the electronic device using the at least one camera, obtain, using the at least one sensor, first sensing information including at least one of first posture information or first position information of the electronic device that correspond to the first image, produce a virtual object that is superimposed on the first image according to a user input while the first image is output to the display, obtain, based on the first image and the first sensing information, first identification information corresponding to the virtual object, obtain a second image that at least partially overlaps the first image using the at least one camera, obtain, using the at least one sensor, second sensing information including at least one of second posture information or second position information of the electronic device that correspond to the second image, obtain second identification information corresponding to the virtual object based on the second image and the second sensing information, and output the virtual object to the display, in response to a case in which information, obtained via the at least one sensor in a state in which the AR application is executed, corresponds to the second sensing information.

According to an embodiment, in a case in which a change in movement (e.g., amount of rotation, amount of translation) of the electronic device falls within a designated range, and a range of overlap between the first image and the second image is less than a threshold value, the at least one processor may be further configured to determine that the second identification information satisfies a designated condition, and in a case in which the second identification information is determined as satisfying the designated condition, the at least one processor may be further configured to obtain the second identification information.

According to an embodiment, the at least one processor may be further configured to obtain the second identification information in at least one of a first time interval before production of the virtual object or a second time interval after production of the virtual object, in the state in which the AR application is executed.

According to an embodiment, the at least one processor may be further configured to output the virtual object to the display in response to a case in which information, obtained via the at least one sensor in the state in which the AR application is executed, corresponds to the first sensing information.

According to an embodiment, the at least one processor may be further configured to output a virtual object including at least one of 3D text, a 3D image, or a 3D video according to the user input.

According to an embodiment, the at least one processor may be further configured to obtain, using a point cloud, information associated with a first space included in the first image and information associated with a second space included in the second image.

According to an embodiment, the information associated with the second space included in the second image may include relative position information of the first image.

According to an embodiment, the electronic device 100 may include a memory, wherein the at least one processor may be further configured to store the first identification information and the second identification information in the memory, and output the virtual object to the display in response to a case in which information, obtained via the at least one camera and the at least one sensor in the state in which the AR application is executed, corresponds to the second identification information stored in the memory.

As described above, a method performed by an electronic device (e.g., the electronic device 100 of FIG. 1) may include an operation of executing an augmented reality (AR) application that uses at least one camera, obtaining, using the at least one camera, a first image of surroundings of the electronic device, obtaining, using at least one sensor, first sensing information including at least one of first information or first position information of the electronic device that correspond to the first image, producing a virtual object that is superimposed on the first image according to a user input while the first image is output to display, obtaining first identification information corresponding to the virtual object based on the first image and the first sensing information, obtaining, using the at least one camera, a second image that at least partially overlaps the first image, obtaining, using the at least one sensor, second sensing information including at least one of second posture information or second position information of the electronic device that correspond to the second image, obtaining second identification information corresponding to the virtual object based on the second image and the second sensing information, and outputting the virtual object to the display in response a case in which information, obtained via the at least one sensor in a state in which the AR application is executed, corresponds to the second sensing information.

According to an embodiment, wherein the at least one processor is further configured to, in a case in which a change in movement (e.g., rotation, translation) of the electronic device falls within a designated range, and a range of overlap between the first image and the second image is less than a threshold value, determine that the second identification information satisfies a designated condition, and in a case in which the second identification information is determined as satisfying the designated condition, obtains the second identification information.

According to an embodiment, the operation of obtaining the second identification information may include an operation of obtaining the second identification information in at least one a first time interval before production of the virtual object or a second time interval after production of the virtual object, in the state in which the AR application is executed.

According to an embodiment, the operation of outputting the virtual object may include an operation of outputting the virtual object in response to a case in which information, obtained via the at least one sensor in the state in which the AR application is executed, corresponds to the first sensing information.

According to an embodiment, the operation of outputting the virtual object may include outputting a virtual object including at least one of 3D text, a 3D image, or a 3D video according to the user input.

According to an embodiment, the operation of obtaining the first image and the second image may include an operation of obtaining, using a point cloud, information associated with a first space included in the first image and information associated with a second space included in the second image.

According to an embodiment, the operation method of the electronic device may include an operation of storing the first identification information and the second identification information in a memory, and an operation of outputting the virtual object to the display in response to a case in which information, obtained via the at least one camera and the at least one sensor in the state in which the AR application is executed, corresponds to the second identification information stored in the memory.

As described above, an electronic device (e.g., the electronic device 100 of FIG. 1) according to an embodiment may include a communication module (e.g., the communication module 260 of FIG. 2), a display (e.g., the display 240 of FIG. 2), at least one sensor (e.g., the sensor 230 of FIG. 2), at least one camera (e.g., the camera 220 of FIG. 2), and at least one processor (e.g., the processor 210 of FIG. 2) operatively connected to the communication module, the display, the at least one sensor, and the at least one camera, wherein the at least one processor is configured to execute an augmented reality (AR) application that uses the at least one camera, obtain a first image of surroundings of the electronic device using the at least one camera, obtain, using the at least one sensor, first sensing information including at least one of first posture information or first position information of the electronic device that correspond to the first image, produce a virtual object that is superimposed on the first image according to a user input while the first image is output to the display, obtain first identification information corresponding to the virtual object based on the first image and the first sensing information, obtain a second image that at least partially overlaps the first image using the at least one camera, obtain, using the at least one sensor, second sensing information including at least one of second posture information or second position information of the electronic device that correspond to the second image, obtain second identification information corresponding to the virtual object based on the second image and the second sensing information, transmit the first identification information and the second identification information to a server via the communication module, to receive the first identification information and the second identification information from the server, and output the virtual object to the display in response to in a case in which information, obtained via the at least one camera and the at least one sensor in a state in which the AR application is executed, corresponds to the second identification information.

According to an embodiment, in a case in which a change in movement (e.g., rotation, translation) of the electronic device falls within a designated range, and if a range of overlap between the first image and the second image is less than a threshold value, the at least one processor may be further configured to determine that the second identification information satisfies a designated condition, and in a case in which the second identification information is determined as satisfying the designated condition, the at least one processor may further be configured to obtain the second identification information.

According to an embodiment, the at least one processor may further be configured to output the virtual object to the display, in response to a case in which information, obtained via the at least one sensor in the state in which the AR application is executed, corresponds to the first sensing information.

According to an embodiment, the at least one processor may further be configured to output, to the display, a virtual object including at least one of 3D text, a 3D image, or a 3D video according to the user input.

According to an embodiment, the at least one processor may further be configured to obtain, using a point cloud, information associated with a first space included in the first image and information associated with a second space included in the second image.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a display;
at least one sensor;
at least one camera; and
memory storing one or more computer programs; and
one or more processors operatively connected to the display, the at least one sensor, the at least one camera, and the memory,
wherein the one or more computer programs include computer-executable instructions that, when executed by the one or more processors, cause the electronic device to:
execute an augmented reality (AR) application that uses the at least one camera,
obtain a first image of surroundings of the electronic device using the at least one camera,
obtain, using the at least one sensor, first sensing information including at least one of first posture information or first position information of the electronic device that correspond to the first image,
while outputting the first image to the display, produce a virtual object that is superimposed on the first image according to a user input,
, based on the first image and the first sensing information, obtain first identification information corresponding to the virtual object,
obtain a second image that at least partially overlaps the first image using the at least one camera,
obtain, using the at least one sensor, second sensing information including at least one of second posture information or second position information of the electronic device that correspond to the second image,
based on a range of overlap between the first image and the second image being less than a threshold value, obtain second identification information corresponding to the virtual object, and
in response to information; obtained via the at least one sensor in a state in which the AR application is executed, corresponding to the second sensing information, output the virtual object to the display.

2. The electronic device of claim 1, wherein the one or more computer programs further include computer-executable instructions that, when executed by the one or more processors, cause the electronic device to:
based on a change in movement of the electronic device being within a designated range, and the range of overlap between the first image and the second image being less than the threshold value, determine that the second identification information satisfies a designated condition, and
in response to determining that the second identification information satisfies the designated condition, obtain the second identification information.

3. The electronic device of claim 2, wherein the change in movement of the electronic device comprises at least one of a rotation or a translation of the electronic device.

4. The electronic device of claim 1, wherein the one or more computer programs include computer-executable instructions that, when executed by the one or more processors, cause the electronic device to;
obtain the second identification information in at least one of a first time interval before production of the virtual object or a second time interval after production of the virtual object, in the state in which the AR application is executed.

5. The electronic device of claim 1, wherein the one or more computer programs include computer-executable instructions that, when executed by the one or more processors, cause the electronic device to;
in response to information; obtained via the at least one sensor in the state in which the AR application is executed, corresponding to the first sensing information, output the virtual object to the display.

6. The electronic device of claim 1, wherein the one or more computer programs include computer-executable instructions that, when executed by the one or more processors, cause the electronic device to:
output the virtual object to include at least one of three dimensional (3D) text, a 3D image, or a 3D video according to the user input.

7. The electronic device of claim 1, wherein the one or more computer programs include computer-executable instructions that, when executed by the one or more processors, cause the electronic device to;
obtain, using a point cloud, information associated with a first space included in the first image and information associated with a second space included in the second image.

8. The electronic device of claim 7, wherein the information associated with the second space included in the second image includes relative position information of the first image.

9. The electronic device of claim 1, wherein the one or more computer programs include computer-executable instructions that, when executed by the one or more processors, cause the electronic device to:
store the first identification information and the second identification information in the memory, and
in response to information; obtained via the at least one camera and the at least one sensor in the state in which the AR application is executed, corresponding to the second identification information stored in the memory, output the virtual object to the display.

10. A method performed by an electronic device, the method comprising:
executing, by the electronic device, an augmented reality (AR) application that uses at least one camera of the electronic device;
obtaining, by the electronic device, a first image of surroundings of the electronic device using the at least one camera;
obtaining, by the electronic device using at least one sensor of the electronic device, first sensing information including at least one of first posture information or first position information of the electronic device that correspond to the first image;

while outputting the first image to a display of the electronic device, producing, by the electronic device, a virtual object that is superimposed on the first image according to a user input;

based on the first image and the first sensing information, obtaining, by the electronic device, first identification information corresponding to the virtual object;

obtaining, by the electronic device using the at least one camera, a second image that at least partially overlaps the first image;

obtaining, by the electronic device using the at least one sensor, second sensing information including at least one of second posture information or -second position information of the electronic device that correspond to the second image;

based on a range of overlap between the first image and the second image being less than a threshold value, obtaining, by the electronic device, second identification information corresponding to the virtual object; and in response to information obtained via the at least one sensor in a state in which the AR application is executed corresponding to the second sensing information, outputting, by the electronic device, the virtual object to the display.

11. The method of claim 10, further comprising:
based on a change in movement of the electronic device being within a designated range, and the range of overlap between the first image and the second image is being less than the threshold value, determining, by the electronic device, that the second identification information satisfies a designated condition; and in response to determining that the second identification information satisfies the designated condition, obtaining, by the electronic device, the second identification information.

12. The method of claim 10, wherein the obtaining of the second identification information comprises obtaining, by the electronic device, the second identification information in at least one a first time interval before production of the virtual object or a second time interval after production of the virtual object, in the state in which the AR application is executed.

13. The method of claim 10, wherein the outputting of the virtual object comprises, in response to a information obtained via the at least one sensor in the state in which the AR application is executed; corresponds to the first sensing information, outputting, by the electronic device, the virtual object.

14. The method of claim 10, wherein the outputting of the virtual object comprises outputting, by the electronic device, the virtual object to include at least one of three dimensional (3D) text, a 3D image, or a 3D video according to the user input.

15. The method of claim 10,
wherein the obtaining of the first image and the second image comprises obtaining, by the electronic device using a point cloud, information associated with a first space included in the first image and information associated with a second space included in the second image, and
wherein the method further comprises:
storing, by the electronic device, the first identification information and the second identification information in a memory of the electronic device; and in response to information; obtained via the at least one camera and the at least one sensor in the state in which the AR application is executed; corresponding to the second identification information stored in the memory, outputting, by the electronic device, the virtual object to the display.

16. An electronic device comprising:
communication circuitry;
a display;
at least one sensor;
at least one camera;
memory storing one or more computer programs; and
one or more processors operatively connected to the communication circuitry, the display, the at least one sensor, the at least one camera, and the memory,
wherein the one or more computer programs include computer-executable instructions that, when executed by the one or more processors, cause the electronic device to:
execute an augmented reality (AR) application that uses the at least one camera,
obtain a first image of surroundings of the electronic device using the at least one camera,
obtain, using the at least one sensor, first sensing information including at least one of first posture information or first position information of the electronic device that correspond to the first image,
while outputting the first image to the display, produce a virtual object that is superimposed on the first image according to a user input,
based on the first image and the first sensing information, obtain first identification information corresponding to the virtual object,
obtain a second image that at least partially overlaps the first image using the at least one camera,
obtain, using the at least one sensor, second sensing information including at least one of second posture information or second position information of the electronic device that correspond to the second image,
based on a range of overlap between the first image and the second image being less than a threshold value, obtain second identification information corresponding to the virtual object,
transmit, to a server via the communication circuitry, the first identification information and the second identification information,
receive, from the server, the first identification information and the second identification information, and
in response to information; obtained via the at least one camera and the at least one sensor in a state in which the AR application is executed, corresponding to the second identification information, output the virtual object to the display.

17. The electronic device of claim 16, wherein the one or more computer programs further include computer-executable instructions that, when executed by the one or more processors, cause the electronic device to:
based on a change in movement of the electronic device being within a designated range, and the range of overlap between the first image and the second image is being less than the threshold value, determine that the second identification information satisfies a designated condition, and in response to determining that the second identification information satisfies the designated condition, obtain the second identification information.

18. The electronic device of claim 16, wherein the one or more computer programs further include computer-executable instructions that, when executed by the one or more processors, cause the electronic device to;

in response to information, obtained via the at least one sensor in the state in which the AR application is executed, corresponding to the first sensing information, output the virtual object to the display.

19. The electronic device of claim 16, wherein the one or more computer programs further include computer-executable instructions that, when executed by the one or more processors, cause the electronic device to;

output, to the display, the virtual object to include at least one of three dimensional (3D) text, a 3D image, or a 3D video according to the user input.

20. The electronic device of claim 16, wherein the one or more computer programs further include computer-executable instructions that, when executed by the one or more processors, cause the electronic device to;

obtain, using a point cloud, information associated with a first space included in the first image and information associated with a second space included in the second image.

* * * * *